United States Patent
Shin et al.

(10) Patent No.: US 7,142,258 B2
(45) Date of Patent: Nov. 28, 2006

(54) IMAGE DISTORTION CORRECTING APPARATUS AND METHOD THEREOF

(75) Inventors: Jong Keun Shin, Gyeongsangbuk-Do (KR); Woo Jin Song, Seoul (KR); Kyu Young Hwang, Pusan (KR); Woong Seo, Gyeongsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 485 days.

(21) Appl. No.: 10/724,037

(22) Filed: Dec. 1, 2003

(65) Prior Publication Data
US 2004/0130669 A1    Jul. 8, 2004

(30) Foreign Application Priority Data
Jan. 8, 2003    (KR) .................... 10-2003-0001150

(51) Int. Cl.
*H04N 3/23* (2006.01)
(52) U.S. Cl. .................... 348/745; 345/746; 345/806
(58) Field of Classification Search ........ 348/745–747, 348/806, 807; 315/368.11, 368.12, 368.18; H04N 3/23
See application file for complete search history.

(56) References Cited

U.S. PATENT DOCUMENTS 6,288,689 B1 * 9/2001 Shikama .................... 345/7
6,491,400 B1 * 12/2002 Chen et al. ................ 348/746

FOREIGN PATENT DOCUMENTS

CN    1659867 A    8/2005

\* cited by examiner

*Primary Examiner*—Sherrie Hsia
(74) *Attorney, Agent, or Firm*—Fleshner & Kim, LLP

(57) ABSTRACT

An image distortion correcting apparatus is provided tat is capable of correcting keystone distortion and pincushion distortion in a video display device. The apparatus may include a reference image generating device for generating a reference image and setting a coordinate of the reference image. A displacement measuring device may display the reference image on a screen and measure a coordinate of the displayed image. A distortion information extracting device may extract distortion information on the basis of a coordinate value of the set reference image and a coordinate value of the measured image and generating inverse-distortion information. Still further, a distortion correcting device may generate an inverse-distorted (pre-warping) image of the reference image on the basis of the generated inverse-distortion information.

20 Claims, 15 Drawing Sheets

IMAGE DISTORTION CORRECTING APPARATUS AND METHOD THEREOF

BACKGROUND OF THE INVENTION

1. Field of the Invention

The present invention relates to an image distortion correcting apparatus for an image display device, and in particular to an image distortion correcting apparatus capable of correcting keystone distortion and pincushion distortion occurred in an image display device efficiently.

2. Description of the Conventional Art

Recently, among image display devices, a projection TV displaying enlarged TV images on a large screen has optical distortion inevitably. The optical distortion can be divided into pincushion distortion and keystone distortion. Herein, the pincushion distortion occurs by a CRT (cathode ray tube; CRT) and a lens, and the keystone distortion occurs by reflection through a reflector.

FIG. 1 illustrates optical distortion occurred in a projection TV.

As depicted in FIG. 1, the projection TV includes CRTs (respectively having a lens for enlarging a video signal) 11, 12, 13 for enlarging an input video signal and outputting it; a reflector 14 for reflecting an image respectively outputted from the CRTs 11, 12, 13; and a screen 15 for displaying a RGB image reflected onto the reflector 14.

Operation of the projection TV will be described.

First, the three R, G, B CRTs 11, 12, 13 are not arranged at the same position but rather are arranged side by side. Each R, G, B CRT 11, 12, 13 enlarges a received image and outputs it to the reflector 14. The reflector 14 displays the enlarged image on the screen 15. Accordingly, the screen 15 displays a certain enlarged color image.

However, because the image displayed on the screen 15 is affected by the plural CRTs 11, 12, 13 and the reflector 14, optical distortion occurs inevitably in displaying of the image. In more detail, in case of an image displayed on the screen 15 in the projection TV, according to relation between arranged position of the CRTs 11, 12, 13 and reflection position of the reflector 14, electron beam locus of the image respectively outputted from the CRTs 11, 12, 13 may not be coincided with each other. Accordingly, crooked or angled electron beam locus may occur on the center, edge, top/bottom and left/right of the screen 15. As described above, image distortion occurs inevitably in the projection TV, and accordingly quality of an image displayed on the screen is lowered. Herein, the electron beam locus means a straight line connecting each CRT 11, 12, 13 to an image-displayed point on the screen 15.

FIG. 2 illustrates simulation results of optical distortion occurred in a projection TV.

As depicted in FIG. 2, in order to show optical distortion occurred in the projection TV, simulations were performed by using a reference grid image 21. First, a first grid image 22 shows a keystone distortion occurred in the reference grid image, and a second grid image 23 shows a pincushion distortion occurred in the reference grid image 21. In addition, a third grid image 24 shows both a keystone distortion and a pincushion distortion occurred in the reference grid image.

As described-above, in the reference grid image 21 of the three CRTs 11, 12, 13, because each CRT has a different reflection point on the reflector 14 and has a different reflection path to the screen 15, the keystone-distorted image 22 having a ladder shape occurs. And, the pincushion-distorted image 23 symmetric on the top and bottom-right and left on the basis of the center of the screen 15 occurs. Herein, the farther from the center of the screen 15, the more severely distortion occurs.

Accordingly, in the reference grid image 21, because the three CRTs 11, 12, 13 are not installed at the same position but rather are arranged in parallel, a degree of the keystone and pincushion distortion is different at the top, bottom, right and left of an image, because the image can not be displayed at the same point of the screen 15, and accordingly a misconvergence phenomenon occurs. Because of that problem, picture quality of the projection TV is lowered.

In order to solve the above-mentioned problem, an image distortion correcting apparatus using a convergence yoke is widely used.

FIG. 3 is a schematic block diagram illustrating a concept of an image distortion correcting apparatus using a convergence yoke in accordance with the conventional art.

As depicted in FIG. 3, in the image distortion correcting apparatus using the convergence yoke, by installing a convergence yoke 32 at a CRT 31 receiving a video signal and applying an appropriate correcting current to the convergence yoke 32 in the horizontal and vertical directions, a path of a video signal outputted from the CRT 31 is adjusted. Accordingly, the optical distortion of a projection 33 can be corrected, and the convergence-adjusted video signal can be displayed on a screen.

However, the image distortion correcting apparatus using the convergence yoke shows nonlinear characteristics such as severe optical distortion, it is very intricate to correct the optical distortion and maintain a high resolution of the image continually after the convergence is adjusted. In addition, in the correcting apparatus using the convergence yoke, in order to get a current received to the convergence yoke 32, a control signal having non-linearity has to be generated, the received current has to be amplified, and accordingly complicated operation and devices are required to process the optical distortion.

In addition, because the correcting apparatus using the convergence yoke uses variation of a magnetic field by adjusting a current received to the convergence yoke 32, it is influenced by the earth magnetic field, and accordingly re-correction is required after performing the distortion correction. In that case, a product has to be re-called, it is not efficient for not only a user but also a manufacturer.

In the meantime, recently not only a CRT-based projection TV but also a LCD (liquid crystal display; LCD)-based projection TV has been provided. In comparison with the CRT, because the LCD is thinner and lighter, it is easy to move, and accordingly a wall-type TV impossible to implement with the CRT can be implemented with the LCD. In addition, the LCD has smaller power consumption, it is efficient in the economical aspect. However, the image distortion correcting apparatus using the convergence yoke can not be applied to the LCD-based projection TV, a new image distortion correcting method has been required.

SUMMARY OF THE INVENTION

In order to solve the above-mentioned problem, it is an object of the present invention to provide an image distortion correcting apparatus having a lighter weight which is capable of not using an additional convergence yoke by correcting image distortion by a digital image processing technique.

It is another object of the present invention to provide an image distortion correcting apparatus capable of having a longer life-span by reducing influence of electromagnetic field due to convergence yoke by correcting image distortion by a digital image processing technique.

It is yet another object of the present invention to provide an image distortion correcting apparatus capable of improving productivity of a product manufacturing step including an image distortion correcting process by correcting image distortion by a digital image processing technique.

In order to achieve the above-mentioned objects, an image distortion correcting apparatus in accordance with the present invention includes a reference image generating means for generating a reference image and setting a coordinate of the reference image; a displacement measuring means for displaying the reference image on a screen and measuring a coordinate of the displayed image; a distortion information extracting means for extracting distortion information on the basis of a coordinate value of the set reference image and a coordinate value of the measured image and generating inverse-distortion information; and a distortion correcting means for generating an inverse-distorted (pre-warping) image of the reference image on the basis of the generated inverse-distortion information.

In order to achieve the above-mentioned objects, an image distortion correcting apparatus in accordance with the present invention includes a digital video signal processing means for converting an input video signal into a digital video signal; an inverse-distortion processing means for performing inverse-distortion processing of the digital video image on the basis of the stored inverse-distortion information; a distortion correction memory means for storing inverse distortion information for inverse distortion-processing; and an image projecting means for displaying the inverse distortion-processed image on the basis of the distortion correction information of the distortion correction memory means.

In order to achieve the above-mentioned objects, an image distortion correcting method in accordance with the present invention includes measuring a keystone distortion-parameter by displaying an input image on a screen; performing inverse keystone distortion-correction of the input image on the basis of the measured keystone distortion-parameter; measuring a pincushion distortion-parameter by displaying the inverse keystone distortion-corrected image on the screen; and performing inverse pincushion distortion-correction of the image displayed on the screen repeatedly on the basis of the measured pincushion distortion-parameter.

In order to achieve the above-mentioned objects, an image distortion correcting method in accordance with the present invention includes initializing a virtual screen showing keystone distortion and pincushion distortion; generating an inverse-distorted image on the basis of the initialized virtual screen; generating a distortion-corrected image on the basis of the generated inverse-distorted image and displaying the generated image on a screen; comparing the distortion-corrected image with the image displayed on the screen; updating the virtual screen when the image displayed on the screen is not coincided with the distortion-corrected image; and finishing the virtual screen updating when the image displayed on the screen is coincided with the distortion-corrected image.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiment of an image distortion correcting apparatus capable of correcting keystone conversion and pincushion conversion efficiently by correcting image distortion on the basis of a three-dimensional virtual screen in accordance with the present invention will be described in detail with reference to accompanying drawings.

The image distortion correcting apparatus in accordance with the present invention performs modeling of a distortion process mathematically while a reference image is displayed on a screen and performs an inverse-distortion process on the basis of the modeling before displaying the reference image stored in a memory on a screen, and accordingly the image distortion-corrected image, namely, an image same with the image stored in the memory is displayed.

Figure 1:
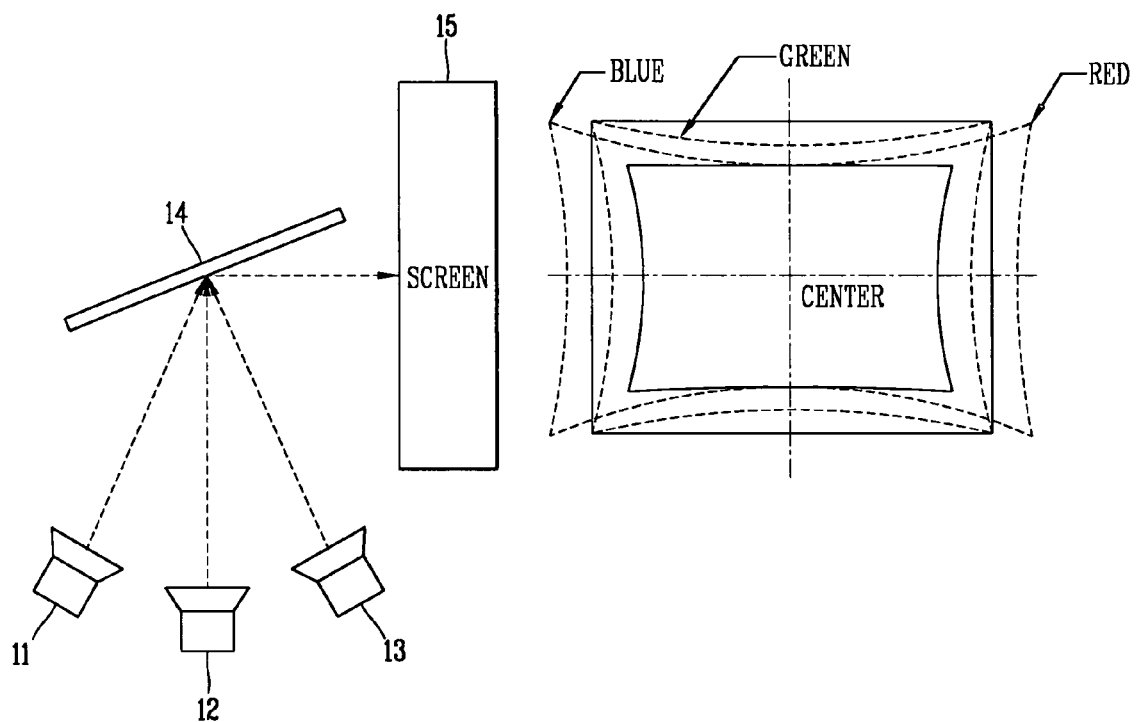
FIG. 1 shows optical distortion occurred in a projection TV.
Figure 2:
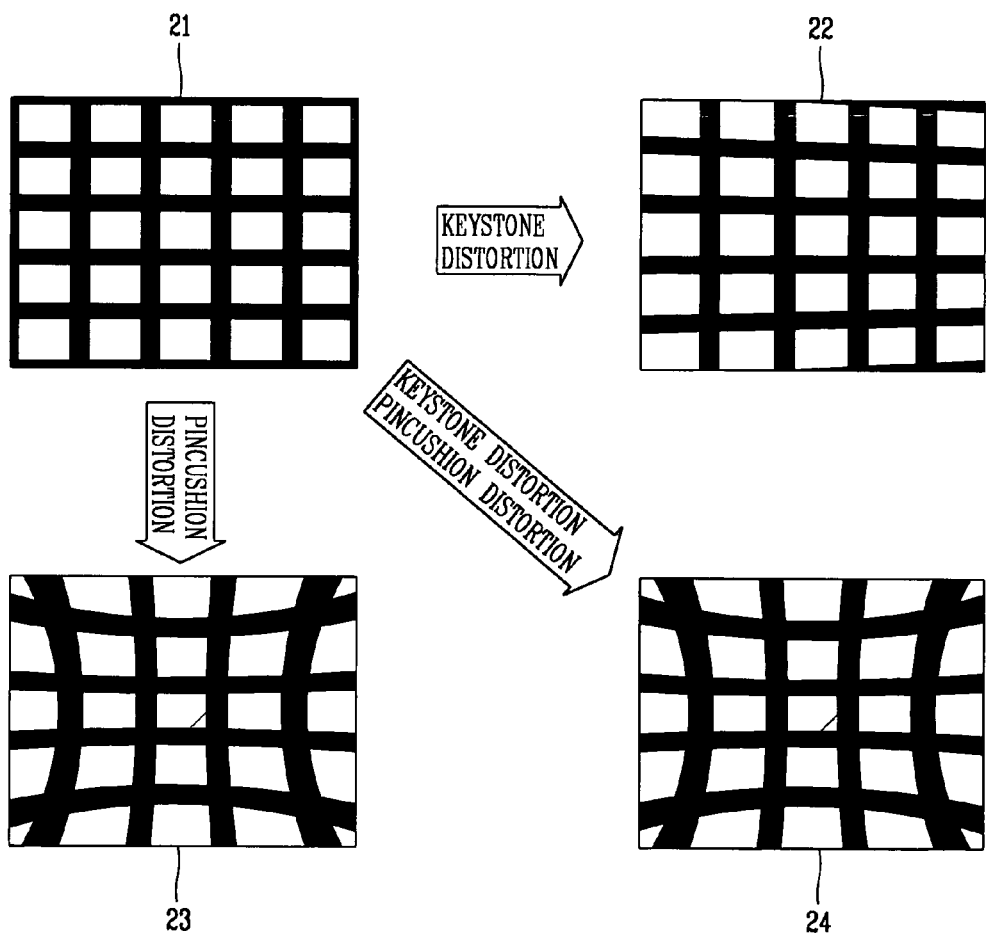
FIG. 2 shows simulation of optical distortion occurred in a projection TV.
Figure 3:
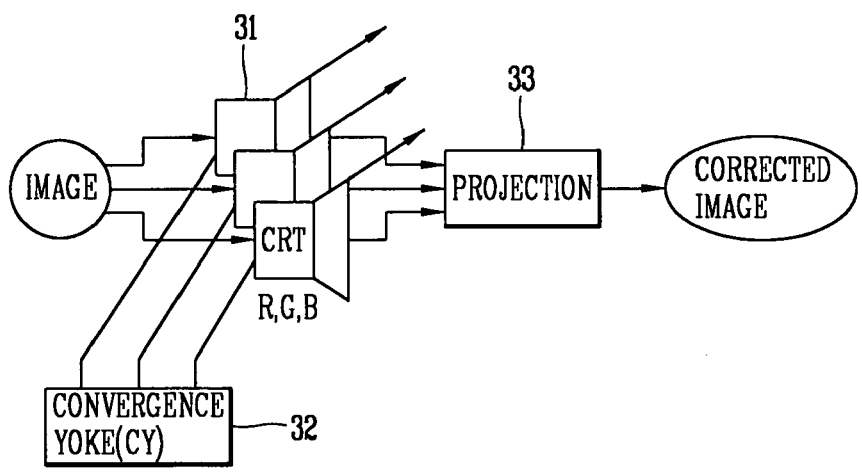
FIG. 3 is a schematic block diagram illustrating a concept of an image distortion correcting apparatus using a convergence yoke in accordance with the conventional art.
Figure 4:
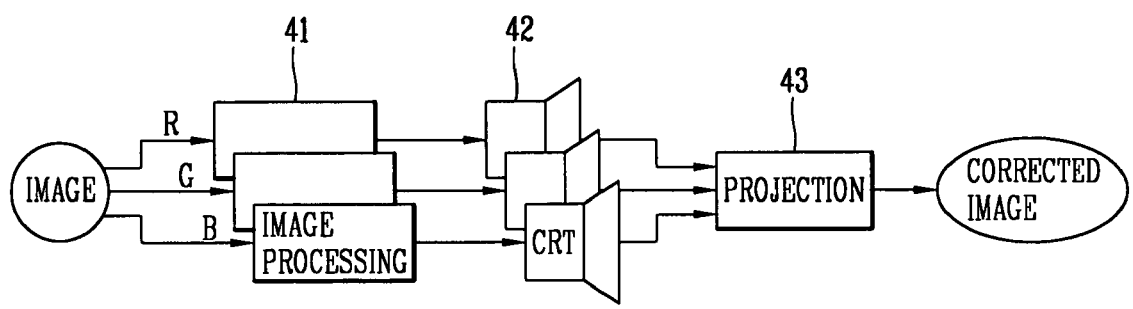
FIG. 4 is a block diagram illustrating a concept of an image distortion correcting apparatus in accordance with the present invention.

FIG. 4 is a block diagram illustrating a concept of an image distortion correcting apparatus in accordance with the present invention.

As depicted in FIG. 4, the image distortion correcting apparatus performs inverse distortion image-processing of an image received from an image processing unit 41 and outputs the inverse distortion-processed signal to a CRT 42, and a projection 43 receives the inverse distortion-processed signal from the CRT 42 and displays it on a screen. In more detail, because the inverse distortion-processed signal is influenced by the keystone distortion and pincushion distortion while being displayed on the screen, the corrected image, namely, an image same with the reference image is displayed on the screen.

The image distortion correcting method for modeling the image distortion process mathematically and correcting the image distortion on the basis of the modeling will be described.

First, when the reference image is I(x,y), the image processing unit 41 performs inverse distortion-processing of the reference image I(x,y) and outputs it to the CRT 42. Herein, when a function for modeling the image distortion process mathematically is T and a function for modeling the inverse-distortion process mathematically is $T^{-1}$, the inverse distortion-processed image is $T^{-1}[I(x,y)]$. Accordingly, the CRT 42 outputs the inverse distortion-processed image $T^{-1}[I(x,y)]$ to the projection 43, and the projection 43 displays the inverse distortion-processed image $T^{-1}[(x,y)]$. Herein, because image distortion occurs while displaying the image on the screen, an undistorted reference image I(x,y) described as $T\{T^{-1}[I(x,y)]\}=I(x,y)$ is displayed.

Hereinafter, the inverse distortion-correcting function $T^{-1}$ is obtained and is implemented as hardware-like. In particular, a method for correcting the image distortion by modeling the inverse distortion-correcting function $T^{-1}$ mathematically on the basis of a three-dimensional virtual screen technique and calculating a correcting parameter on the basis of that will be described.

Figure 5:
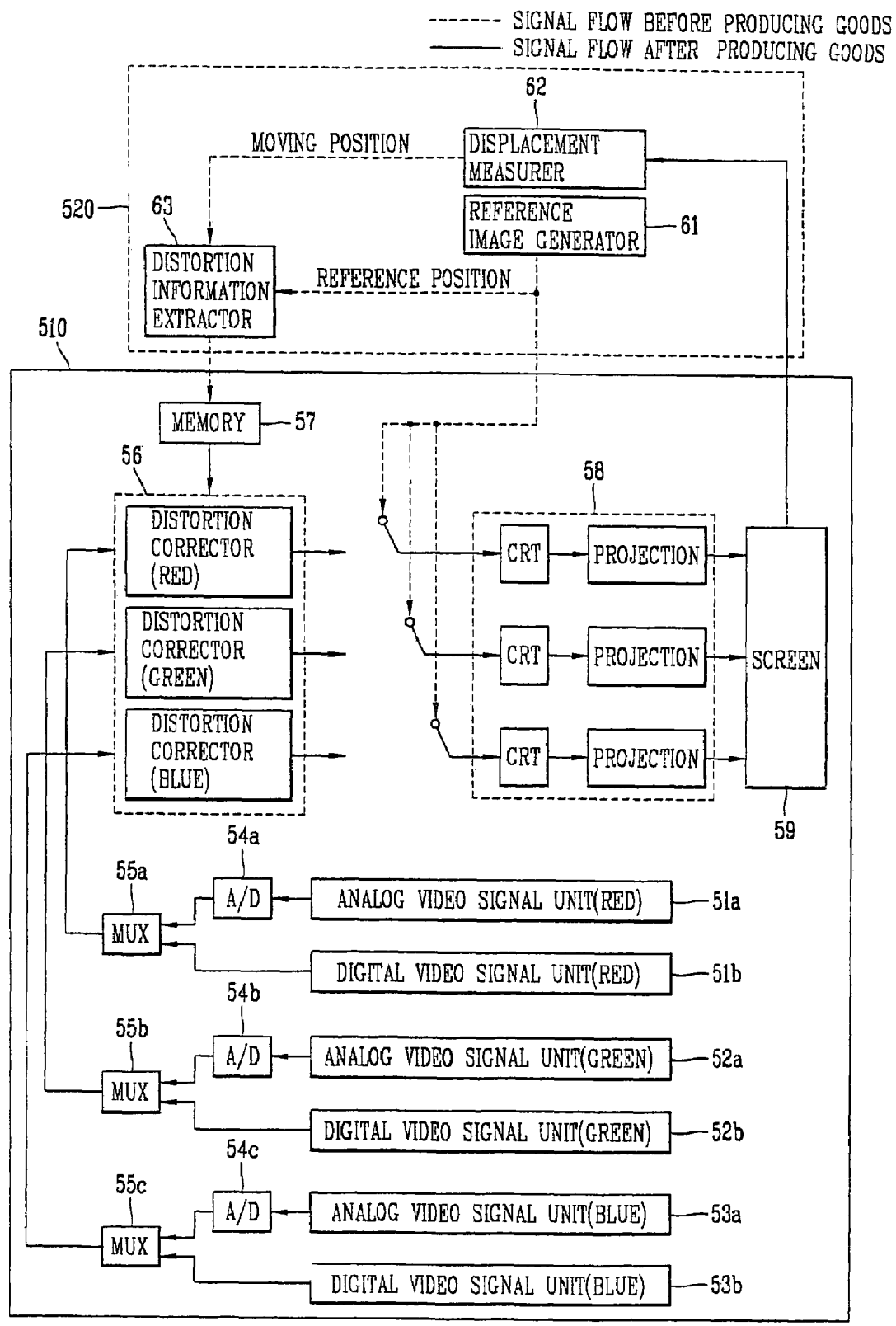
FIG. 5 is a block diagram illustrating a construction of the image distortion correcting apparatus in accordance with the present invention.

FIG. 5 is a block diagram illustrating a construction of the image distortion correcting apparatus in accordance with the present invention.

As depicted in FIG. 5, the image distortion correcting apparatus includes a projection TV unit 510 and an inverse-distortion information generator 520. Construction and operation of the projection TV 510 and the inverse-distortion information generator 520 will be described in detail.

First, the projection TV unit 510 includes analog video signal units 51a, 52a, 53a and digital video signal units 51b, 52b, 53b for receiving video signals; analog/digital converters 54a, 54b, 54c for converting analog video signals into digital video signals; multiplexers 55a, 55b, 55c for selecting one of output signals or one of digital video signals outputted from the analog/digital converters 5a, 54b, 54c; a distortion corrector 56 for performing inverse-distortion processing of the signals outputted from the multiplexers 55a, 55b, 55c on the basis of inverse-distortion correcting information; a memory 57 for storing the inverse-distortion correcting information (parameter); an image projection processor 58 for receiving an inverse-distortion-processed signal from the distortion corrector 56; and a screen 59 for displaying the inverse-distortion-processed signal outputted from the image projection processor 58.

The projection TV unit 510 receives the analog video signals and the digital video signals. Herein, the analog video signals are converted into digital video signals by the analog/digital converters 54a, 54b, 54c. Each multiplexer 55a, 55b, 55c selects one of the signals outputted from the analog/digital converts 54a, 54b, 54c or one of the video signals outputted from the digital video signal units 51b, 52b, 53b and outputs it to the distortion corrector 56. The distortion corrector 56 performs a keystone inverse-distortion and pincushion inverse-distortion processing process of the outputted video signal on the basis of the inverse-distortion correcting parameter stored in the memory 57 and outputs it to the image projection processor 58. The image projection processor 58 displays the keystone inverse-distortion and pincushion inverse distortion-processed signal on the screen 59. Herein, when the video signal is displayed on the screen 59, keystone distortion and pincushion distortion occur inevitably. Accordingly, when the inverse distortion-processed video signal is displayed on the screen 59, the original image not affected by the keystone distortion and the pincushion distortion is displayed on the screen 59.

Next, the inverse-distortion information generator 520 includes a reference image generator 61 for generating a reference image, outputting it to the image projection processor 58 and setting a coordinate of the reference image; a displacement measurer 62 for measuring a coordinate of the keystone distortion and pincushion distortion-occurred image when the reference image is displayed on the screen; and a distortion information extractor 63 for extracting image distortion information on the basis of the image coordinate outputted from the reference image generator 61 and the displacement measurer 62 and outputting it to the memory 57.

In the inverse-distortion information generator 520, the reference image generator 61 generates a reference image, outputs it to the image projection processor 58 and sets a pixel coordinate of the reference image. When the reference image is displayed on the screen 59 through the image projection processor 58, the keystone distortion and the pincushion distortion occur in the displayed image. Herein, the displacement measurer 62 measures a pixel coordinate of the distorted image. And, a correspondence relation between the pixel coordinate (u, v) of the reference image and the pixel coordinate (x, y) of the distorted image is obtained. Herein, the correspondence relation can be obtained through a distortion correcting process using the conventional convergence yoke or by setting a coordinate on the screen 59.

Afterward, the distortion information extractor 63 performs modeling of the image distortion mathematically on the basis of the correspondence relation. Herein, in the mathematical modeling of the image distortion, image warping for applying geometrical distortion to the image by converting a pixel position in the image is used as an image processing technique. The image is rotated, moved, enlarged and reduced through the image warping, a relational expression between the pixel coordinate (u, v) of the reference image and the pixel coordinate (x, y) of the distorted image is obtained through that process, and an inverse-distorted image is obtained on the basis of the relational expression.

Accordingly, the obtained inverse-distortion information is stored in the memory 57 of the projection TV unit 510. Afterward, because the projection TV unit 510 can predict distortion occurred in displaying of the image on the screen on the basis of the inverse-distortion information of the memory 57, it performs pre-warping of the image, and finally the distortion-corrected image is displayed on the screen 59.

However, generally a pixel coordinate value of the image passing the geometric conversion does not have a constant value, interpolation is necessary in digital image warping. In addition, the image distortion correcting is performed on an actually displayed image, real-time processing is required.

Hereinafter, the keystone distortion and the pincushion distortion modeling, distortion correcting algorithm, virtual screen application and the interpolation technique will be described in detail.

In the image distortion correcting method, in extracting of information (parameter) related to the keystone distortion and the pincushion distortion accurately, the distortion correcting process can be performed accurately through the image warping performing the inverse-distortion process.

Following Equation 1 shows modeling of a keystone distortion on the basis of relations among a coordinate (u, v) of a reference image, a temporary coordinate (X', Y', Z'), a coordinate of a distorted image (X, Y) and a parameter (K).

$$\begin{bmatrix} X' \\ Y' \\ Z' \end{bmatrix} = K \begin{bmatrix} U \\ V \\ 1 \end{bmatrix} \text{ where, } K = \begin{bmatrix} k_{11} k_{12} k_{13} \\ k_{21} k_{22} k_{23} \\ k_{31} k_{32} 1 \end{bmatrix} \quad [\text{Equation 1}]$$

$X=X'/Z', Y=Y'/Z'$

Following Equation 2 shows modeling of pincushion distortion on the basis of relations among a coordinate (u, v) of a reference image, a temporary coordinate (X', Y', Z'), a coordinate of a distorted image (X, Y) and a parameter (K).

[Equation 2]

$\overline{U}=U-C_x$ $\overline{V}=V-C_x$ $r=[\overline{U}^2+\overline{V}^2]^{1/2}$ $X=U+\overline{U}\cdot(K_0{}^u+K_u{}^2r^2)$ $Y=V+\overline{V}\cdot(K_0{}^v+K_v{}^2r^2)$ In the image distortion correcting method, in order to extract a distortion parameter as Equation 1 and Equation 2, displacement of characteristic points of an image displayed on the screen have to be grasped. However, because the keystone distortion and the pincushion distortion complexly occur on an image displayed on the screen, it is difficult to obtain the pincushion distortion parameter by measuring an image coordinate when the keystone distortion is completely corrected or the keystone distortion parameter is obtained by measuring an image coordinate when the pincushion distortion is completely corrected. In more detail, it is difficult to obtain each parameter corresponded to the keystone distortion and the pincushion distortion independently.

In order to solve the above-mentioned problem, in the image distortion correcting method in accordance with the present invention, each parameter corresponded to the keystone distortion or the pincushion distortion is gradually updated after performing general correction about the keystone distortion or the pincushion distortion. In more detail, the keystone distortion exists uniformly along the whole screen, unlike that, the further from the center of the screen, the more severely the pincushion distortion occurs. When a certain image coordinate is obtained only on the central portion of the screen and a distortion degree is measured, the keystone distortion exists constantly, on the contrary, the pincushion distortion is insignificant. Accordingly, comparatively accurate keystone parameter value can be obtained at the central portion of the screen.

Herein, in the projection TV, the pincushion distortion occurs first by the CRT and the lens, afterward, the keystone distortion occurs by the reflector. Because the image distortion correcting method performs inverse-distortion of the image by performing an inverse process of distortion, an inverse process of the keystone distortion has to be performed first, afterward, an inverse process of the pincushion distortion is performed.

Figure 6:
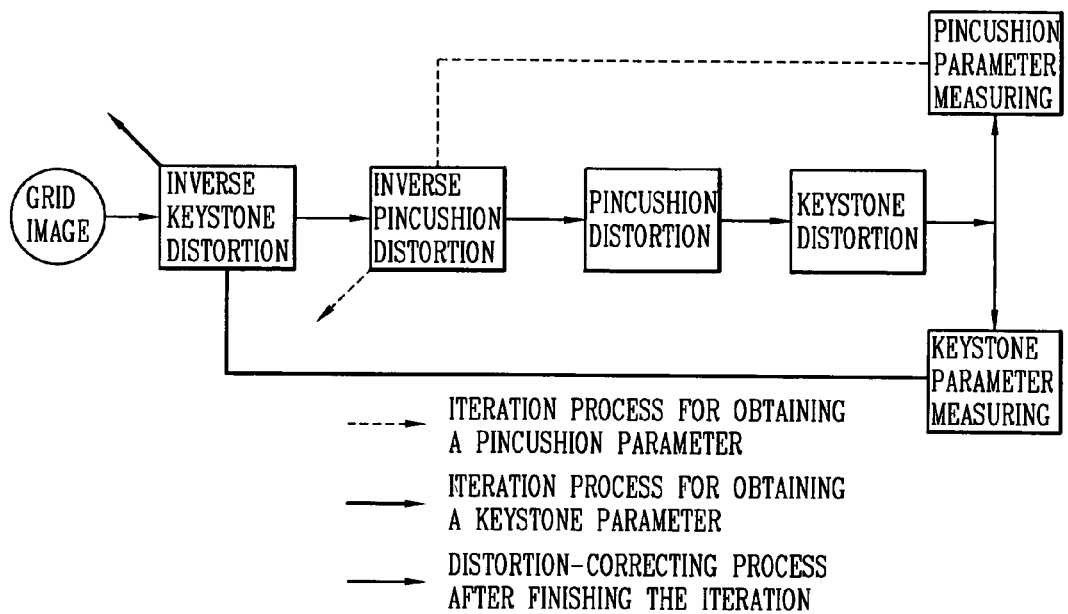
FIG. 6 is a block diagram illustrating an image distortion correcting method in accordance with the present invention.

FIG. 6 is a block diagram illustrating an image distortion correcting method in accordance with the present invention. As depicted in FIG. 6, when a grid image is displayed on the screen, on the basis of a keystone distortion parameter approximately extracted from the displayed grid image, the grid image is inverse keystone distortion-processed and is displayed on the screen, and accordingly an approximately keystone distortion-corrected image is displayed on the screen. Afterward, by extracting an image coordinate again from the keystone distortion-corrected image, a pincushion distortion parameter is obtained. On the basis of the obtained pincushion distortion-parameter, the grid image is inverse pincushion distortion-processed and is displayed on the screen, and accordingly an approximately pincushion distortion-corrected image is displayed on the screen. As described above, by repeating the distortion correcting process alternately, a distortion parameter value more accurate than a previous distortion parameter value can be obtained. Accordingly, a keystone distortion parameter value and a pincushion distortion parameter value are updated gradually.

However, in the image distortion correcting method, because a device having a program for obtaining a distortion parameter and an inverse-distorted image on the basis of Equation 1 and Equation 2 is required, there are difficulties to use the method in the general home. In addition, in fabrication of hardware, because a user has to correct distortion by updating total twelve distortion parameter values directly with a remote controller, it is inconvenient to a user. Accordingly, more simplified interface is required.

Hereinafter, in order to solve the above-mentioned problem, a convergence distortion correcting method using an elevation technique is described.

Figure 7:
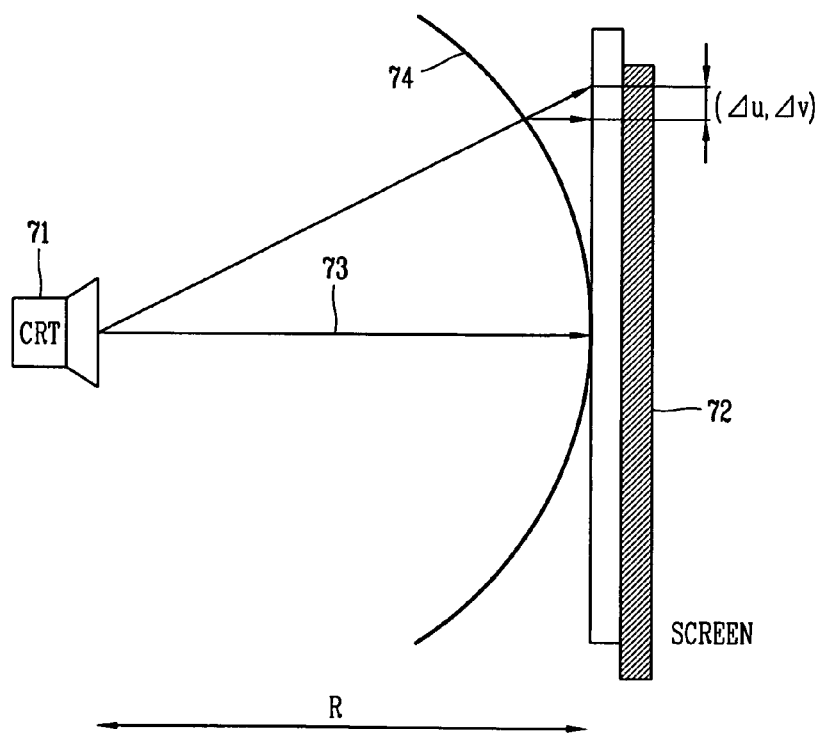
FIG. 7 illustrates a pincushion distortion phenomenon in accordance with the present invention.

FIG. 7 is for describing a pincushion distortion phenomenon in accordance with the present invention.

As depicted in FIG. 7, in consideration of only pincushion distortion, the projection TV projects electron beams from a certain point of the CRT 71 to each pixel of the screen 72 existing on the two-dimensional plane. Because a distance from the CRT 71 to the screen 72 is different from each other and an electron beam curving phenomenon occurs due to the surrounding electric field, the pincushion distortion occurs. Herein, it is assumed the electron beam goes straight, a straight line 73 connecting the CRT 71 to a projected point on the screen 72 shows electron beam locus.

When it is assumed the image is displayed on the screen without image distortion, a line vertically drawn from a pixel of an image displayed on the screen to the screen and the electron beam locus displaying the pixel cross each other. When cross points corresponded to all pixels of the image displayed on the screen are connected, a three-dimensional virtual surface 74 can be generated between the CRT 71 and the screen 72. In more detail, when a distance (R) from the three-dimensional virtual plane 74, the CRT 71 to the actual screen 72 is known, distortion information about the pincushion distortion can be obtained, and mathematical modeling thereof can be performed.

Figure 8:
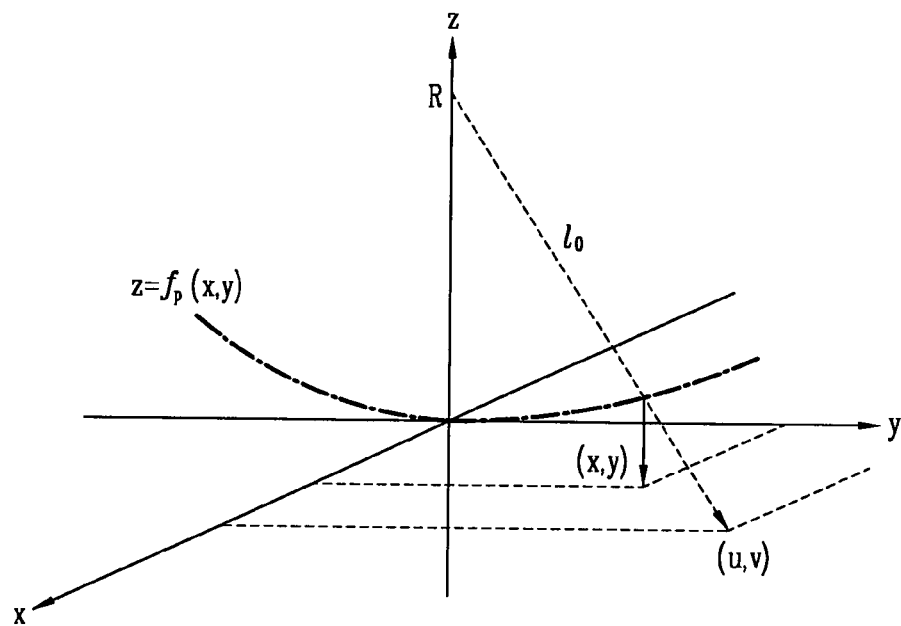
FIG. 8 shows a virtual plane modeling the pincushion distortion in accordance with the present invention.

FIG. 8 shows a virtual plane obtained by modeling pincushion distortion in accordance with the present invention.

As depicted in FIG. 8, the actual screen exists on a XY plane as Z=0, the three-dimensional virtual plane is a virtual screen by the pincushion distortion, namely, z=fp(x,y) function. Accordingly, a relational equation among the virtual screen, the reference image coordinate and the distortion image coordinate can be described as following. When a straight line connecting (0,0,R) and (x0,y0,fp(x0,y0)) is $l_0$, a cross point (u,v) of $l_0$ and the XY plane can be obtained by following Equation 3.

$$u = \frac{-x_0 R}{f_p(x_0, y_0) - R}, \quad v = \frac{-y_0 R}{f_p(x_0, y_0) - R} \quad \text{[Equation 3]}$$

As shown in Equation 3, the distortion image coordinate (u, v) can be obtained by using a distance R from the CRT 71 to the center of the actual screen and a virtual screen function (z=fp(x, y)) value. Herein, the R is a constant given to all projection TVs, it means fp(x, y) has all distortion information. For example, in a certain pixel, in a random pixel, when a value of fp(x, y) is far less than the R, it can be known there is little distortion.

Figure 9:
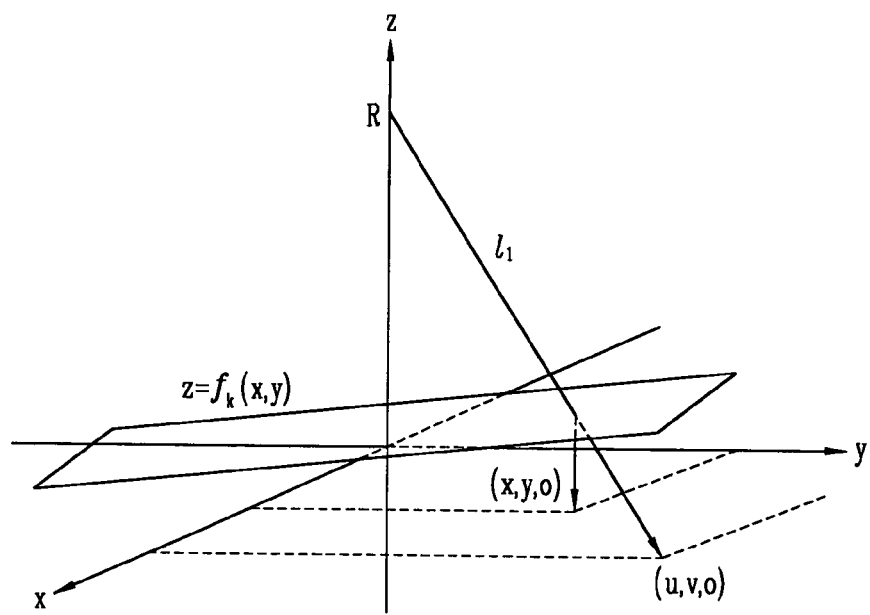
FIG. 9 shows a virtual plane modeling the keystone distortion in accordance with the present invention.

FIG. 9 shows a virtual plane obtained by modeling keystone distortion in accordance with the present invention.

As depicted in FIG. 9, the keystone distortion modeling is performed by a method same with the pincushion distortion modeling and can be described as following Equation 4. In more detail, when a straight line connecting (0,0,R) and (x1,y1,fk(x1,y1)) is $l_1$, a cross point of the $l_1$ and the XY plane is (u, v).

$$u = \frac{-x_1 R}{f_p(x_1, y_1) - R}, \quad v = \frac{-y_1 R}{f_p(x_1, y_1) - R} \quad \text{[Equation 4]}$$

As depicted in Equation 4, the distortion image coordinate (u, v) can be obtained when a virtual screen function (z=fK(x, y)) value of the R and the keystone distortion is obtained.

However, a virtual screen function of the keystone distortion and the pincushion distortion is initialized according to characteristics. In more detail, as depicted in FIGS. 7~9, the pincushion distortion has nonlinear characteristics greatly influenced by a distance R from a source of light, on the contrary, the keystone distortion has linear characteristics such as reflection of a reflector, and accordingly a virtual screen function of the keystone distortion/pincushion distortion distortion can be respectively initialized as following Equation 5 and Equation 6.

[Equation 5]

$$z = f_p(x,y) = R - \sqrt{R^2 - x^2 - y^2}$$

[Equation 6]

$$z = f_p(x,y) = ax + by + d$$

As described above, in the image distortion correcting method in accordance with the present invention, by performing modeling of the keystone distortion/pincushion distortion parameter on the basis of the three-dimensional virtual screen, a distortion parameter value can be calculated.

A merit of performing modeling on the basis of the three-dimensional virtual screen is capable of showing each distortion only by adding a virtual screen functional value of the pincushion distortion and a virtual screen functional value of the keystone distortion linearly. Accordingly, the distortion can be corrected by varying a virtual screen obtained by adding each virtual screen functional value without considering the pincushion distortion and the keystone distortion independently about all pixels, respectively. But, in order to perform more accurate distortion correction, the virtual screen has to be updated repeatedly.

When a updated virtual screen is $F_n$, it can be described as following Equation 7.

[Equation 7]

$$F_0(x,y) = f_p(x,y) + f_k(x,y) = R - \sqrt{R^2 - x^2 - y^2} + ax + by + d$$

$$F_{n+1}(x,y) = F_n(x,y) \pm \Delta(x,y)$$

Accordingly, in consideration of Equations 5~7, a coordinate (u, v) of the finally distorted image to a coordinate (x, y) of the reference image can be obtained as following Equation 8.

$$u = \frac{-xR}{F_n(x, y) - R}, \quad v = \frac{-yR}{F_n(x, y) - R} \quad \text{[Equation 8]}$$

Figure 10:
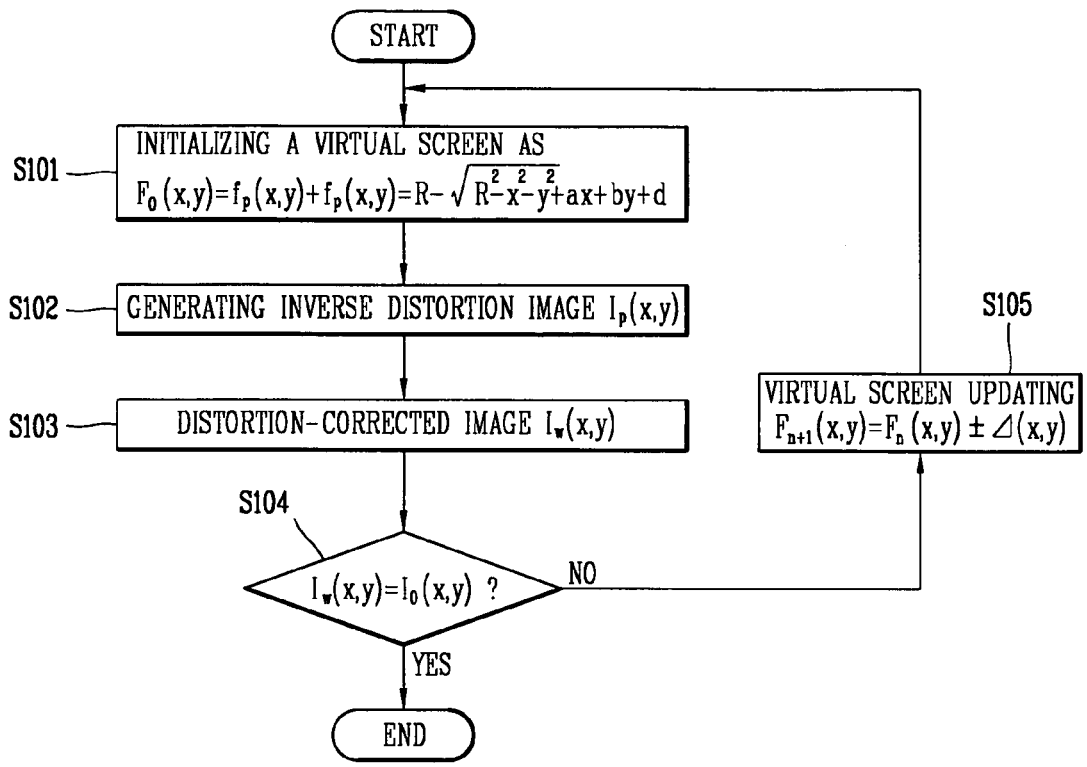
FIG. 10 is a flow chart illustrating a virtual screen processing method in accordance with the present invention.

FIG. 10 is a flow chart illustrating a virtual screen processing technique in accordance with the present invention.

As depicted in FIG. 10, the thee-dimensional virtual screen technique includes initializing a virtual screen as following Equation 7 on the basis of the coordinate (x, y) of the reference image and the coordinate (u, v) of the distorted image as shown at step S101; generating an inverse-distorted image $I_p(x, y)$ on the basis of the initialized virtual screen as shown at step S102; displaying an image $I_w(x,y)$ distortion-corrected on the basis of the generated inverse-distorted image on the screen as shown at step S103; judging whether the image $I_o(x, y)$ displayed on the screen is coincides to the distortion-corrected image $I_w(x, y)$ as shown at step S104; updating the virtual screen when the image $I_o(x, y)$ displayed on the screen does not coincide to the distortion-corrected image $I_w(x, y)$ as shown at step S105; and finishing the virtual screen updating when the image $I_o(x, y)$ displayed on the screen coincides with the distortion-corrected image $I_w(x,y)$. Herein, the virtual screen is updated in the step S105, and the steps are performed repeatedly starting from the virtual screen initializing step S101.

In the three-dimensional virtual screen technique, an inverse-distortion parameter is obtained, and a geometrical conversion function T for performing the distortion correction on the basis of the inverse-distortion parameter is obtained. And, an inverse-directional warping image is called an inverse-distortion (pe-warping) image.

Following Equation 9 shows a relation among a coordinate (x,y) of the reference image, a coordinate (u,v) of a distorted image and a coordinate $(u_{inv}, v_{inv})$ of an inverse-distorted image.

[Equation 9]

$$(x,y) = T[(u_{inv}, v_{inv})]$$

$$(u,v) = T[(x,y)]$$

As depicted in Equation 9, in the three-dimensional virtual screen technique, in order to obtain the inverse-distorted image, it has to be known which coordinate is warped to a coordinate of the inverse-distorted image. In more detail, in Equation 9, when $(u_{inv}, v_{inv})$ is warped by the function T, a coordinate of the reference image corresponded to the warped image has to be known. Herein, an actually obtained coordinate value of the reference image has not an integer value but a real number value, interpolation is required. When the obtained inverse-distorted image is displayed on the screen through the projection, it is converted into an image in which distortion of the reference image is corrected, and it is outputted.

However, because an image coordinate calculated in obtaining of the inverse-distorted image has a real number unit, when an inverse-corrected image is obtained by updating the virtual screen, a difference between the obtained inverse-corrected image and a previous image (before updating) has to be not greater than one pixel. In order to make that difference not greater than one pixel unit, in the three-dimensional virtual screen technique, in consideration of a present coordinate of an image and a present virtual screen Fn, a step size $(\Delta(x,y))$ is limited so as to be not greater than half pixel.

$$\Delta(x, y) = \frac{R^2 \cdot \sqrt{M^2 + N^2}}{2(F_n(x, y) + R) \cdot \sqrt{x^2 + y^2}} \quad \text{[Equation 10]}$$

By substituting Equation 10 for Equation 7, finally the three-dimensional virtual screen technique capable of performing pixel unit procesing can be described as following Equation 11.

$$F_0(x, y) = \quad \text{[Equation 11]}$$
$$f_p(x, y) + f_k(x, y) = R - \sqrt{R^2 - x^2 - y^2} + ax + by + d$$
$$F_{n+1}(x, y) = F_n(x, y) \pm \Delta(x, y) =$$
$$\frac{R^2 \cdot \sqrt{M^2 + N^2}}{2(F_n(x, y) + R) \cdot \sqrt{x^2 + y^2}}$$

As described-above, the virtual screen technique for performing image processing by modeling image distortion information three-dimensionally can be applied to not only a projection TV but also a video display device based on a LCD (liquid crystal display) or a PDP (plasma display panel). In addition, in the virtual screen technique, it is possible to divide a virtual screen into a certain blocks in processing, it can be freely applied to implementation of hardware by adjusting distortion information quantity according to picture difference. In addition, it is possible to amend distortion information by varying a virtual screen simply, when it is implemented as hardware, interface adjustable easily can be fabricated.

Hereinafter, a silicon convergence device implementing the inverse-distortion correcting apparatus as hardware will be described in detail.

Figure 11:
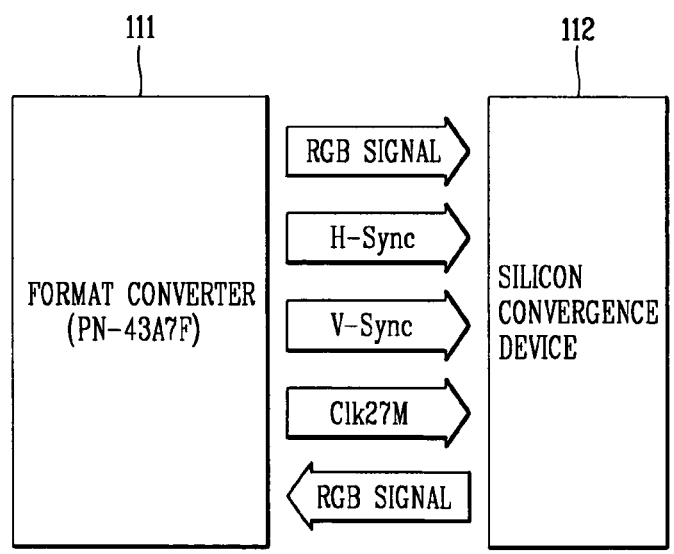
FIG. 11 is a block diagram illustrating a relation between input and output of a silicon convergence device in accordance with the present invention.

FIG. 11 is a block diagram illustrating input/output relations of the silicon convergence device in accordance with the present invention.

As depicted in FIG. 11, a format converter 111 provides a RGB signal, a horizontal synchronous signal H-Sync), a vertical synchronous signal (V-sync) and a clock (Clk_ 27M) to a silicon convergence device 112. The silicon convergence device 112 generates inverse-distortion correction image on the basis of the virtual screen technique and outputs it to the format converter 111, it can be implemented as a PLD (programmable logic device) such as a FPGA (filed programmable gate array), when it is applied to a real product, it is general to use a full-custom method as ASIC in the economical or technical aspects.

The format converter 111 converts a R, G, B video signal having a two-dimensional coordinate into a digital video signal by using a vertical frequency, a horizontal frequency and a pixel frequency.

The silicon convergence device 112 performs distortion analysis of the digital R, G, B video signal received from the format convener 111 on the basis of the three-dimensional virtual screen technique, generates inverse-distortion information according to it and outputs a pertinent R, G, B signal to the format converter 111. Herein, the silicon convergence device 112 includes each construction part for generating a coordinate of a digital image, storing it and performing the above-mentioned interpolation.

Figure 12:
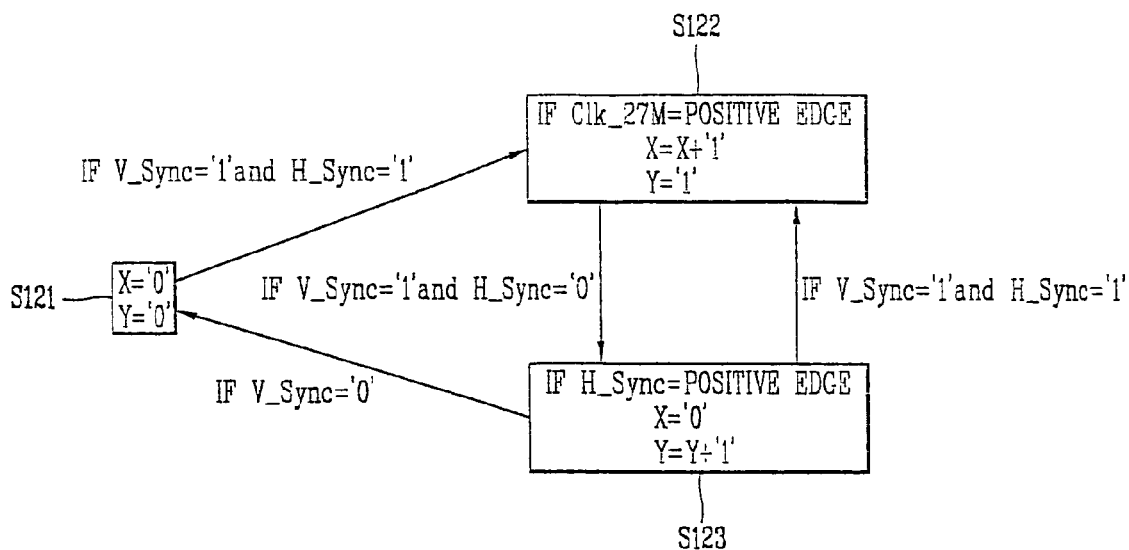
FIG. 12 is a block diagram illustrating a generation order of image coordinates in accordance with the present invention.

FIG. 12 is a block diagram illustrating a generation order of an image coordinate in accordance with the present invention.

As depicted in FIG. 12, a generation order of the image coordinate is based on three stages S121, S122, S123. It will be described in detail.

First, by counting a positive edge of a vertical synchronous signal (V-Sync), an odd number frame and an even number frame are determined. Afterward, the image coordinate is generated on the basis of relations of input signals. In more detail, a positive edge of the horizontal synchronous signal (H-Sync) indicates a start of a horizontal line in a vertical synchronous signal high region, by counting a positive edge of the horizontal synchronous signal (H-Sync), a vertical coordinate is generated. And, when both the vertical synchronous signal (V-Sync) and the horizontal synchronous signal (H-Sync) are high, a clock (Clk_27M) indicates a horizontal frequency of a pixel, by counting a positive edge of a clock, a horizontal coordinate can be generated. In addition, in a vertical signal low region, both vertical and horizontal coordinates are updated as '0', in the horizontal synchronous signal (H-Sync) low region, only the horizontal coordinate is updated as '0'. Accordingly, a two-dimensional coordinate of a digital video signal is generated by the method, and the generated digital video signal is stored in the memory.

Figure 13:
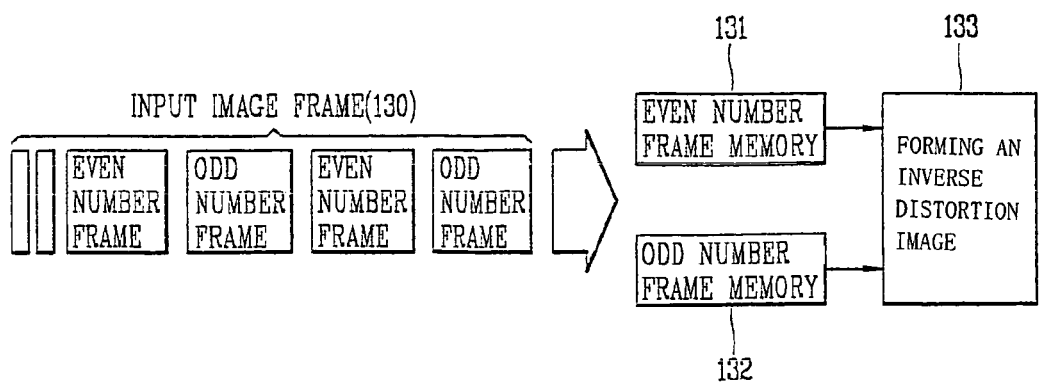
FIG. 13 is a block diagram illustrating a digital image storing method in accordance with the present invention.

FIG. 13 is a block diagram for illustrating a digital image storing method in accordance with the present invention.

As depicted in FIG. 13, an input image frame 130 is divided into an even number frame and an odd number frame, and each frame is processed repeatedly. In more detail, when an odd number frame image is stored in the odd number frame memory 131, a warped image of the even number frame memory 132 is outputted, when an even number frame image is stored in the even number frame memory 132, a warped image of the odd number frame memory 131 is outputted, by performing the process repeatedly, an inverse-distorted image 133 is formed.

Each memory 131, 132 uses a SRAM (static random access memory) so as to perform high speed storing and access of the odd number/even number frame, each pixel information includes 9 bit of a vertical coordinate, 10 bit of a horizontal coordinate and 8 bit of a pixel value, and accordingly it consists of total 27 bit. Accordingly, the ARAM used for the silicon convergence device is designed so as to include information such as address 20 bit and data 8 bit, herein, 9 bit of a vertical coordinate and 10 bit of a horizontal coordinate are address bit of the silicon convergence device, and 8 bit of a pixel value is data bit of the silicon convergence device.

Figure 14A:
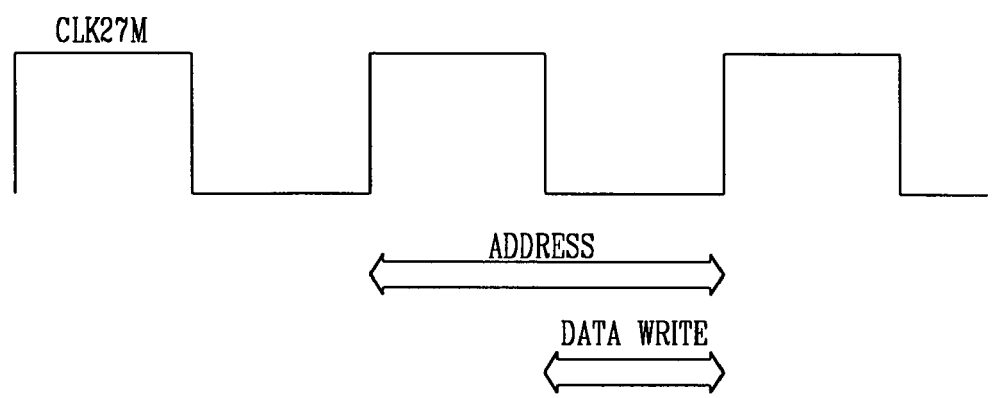
FIG. 14A illustrates timing at which digital data is written in a memory of the image distortion correcting apparatus in accordance with the present invention.
Figure 14B:
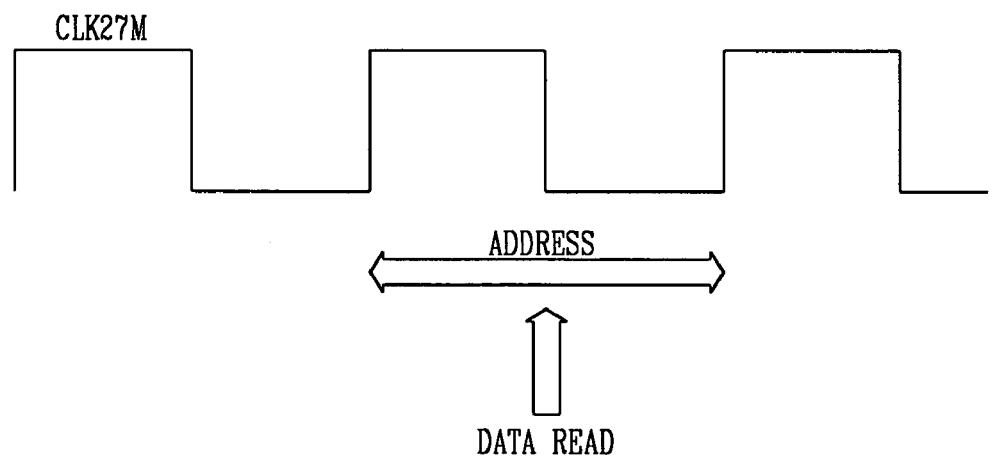
FIG. 14B illustrates timing at which digital data is read from a memory of the image distortion correcting apparatus in accordance with the present invention.

FIG. 14A illustrates timing at which digital data is written in a memory of the image distortion correcting apparatus in accordance with the present invention, and FIG. 14B illustrates timing at which digital data is read from a memory of the image distortion correcting apparatus in accordance with the present invention.

As depicted in FIGS. 14A and 14B, when a Clk__27M signal is in a high region, the image distortion correcting apparatus outputs the horizontal coordinate and the vertical coordinate to the ARAM as address bit, when a Clk__27M signal is in a low region, the outputted pixel value is stored in the SRAM. In the other hand, when the Clk__27M signal is negative edge, the pixel value is read from the SRAM, it is for preventing the pixel value from being propagated in the operational process.

As described-above, in the pixel value of a digital image, because only an integer coordinate exists, the image distortion correcting apparatus, the interpolation for changing a real number coordinate value converted through the image warping into a pixel value of an integer coordinate is required for the image distortion correcting apparatus.

Figure 15:
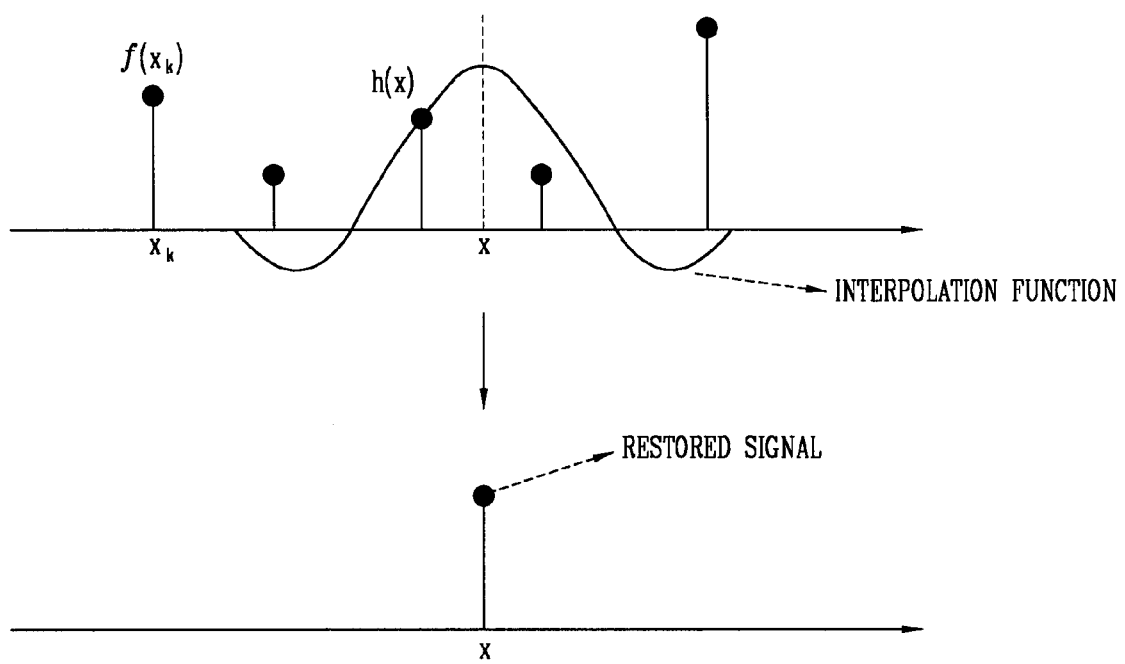
FIG. 15 is for describing a concept of one-dimensional signal interpolation in accordance with the present invention.

FIG. 15 is for describing a concept of one-dimensional signal interpolation in accordance with the present invention.

As depicted in FIG. 15, when a data value is distributed at the same interval, a method for calculating a request pixel value by using an adjacent pixel value will be described.

When a requested random pixel value is f(x), it can be obtained as $$f(x) = \sum_{k=0}^{k-1} c_k h(x - x_k).$$

Figure 16A:
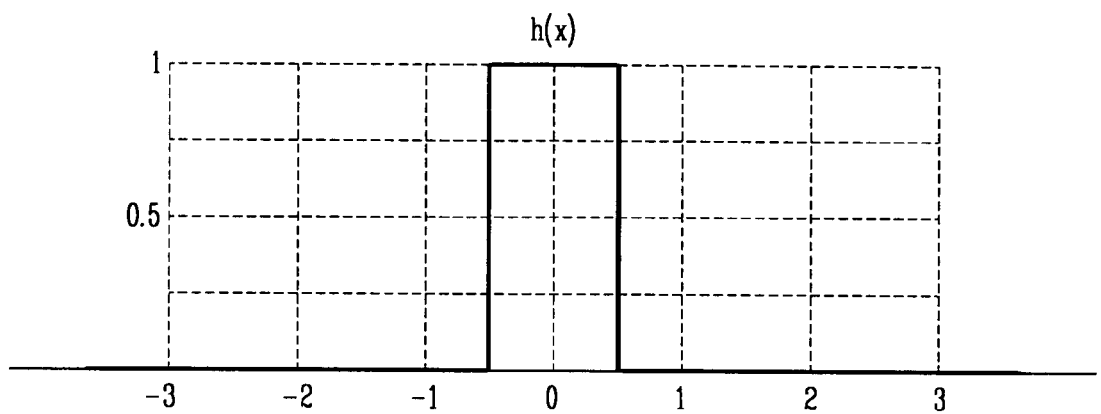
FIG. 16A illustrates a nearest interpolation function in accordance with the present invention.
Figure 16B:
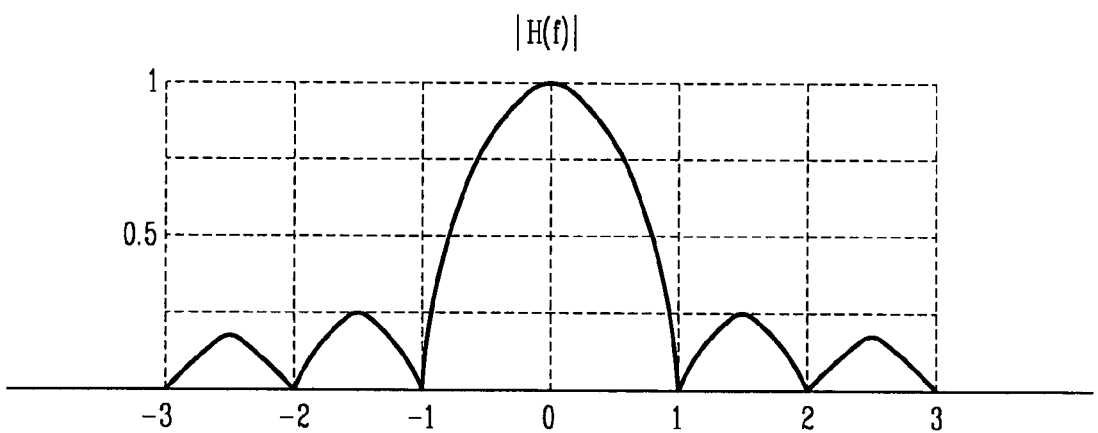
FIG. 16B illustrates Fourier conversion of the nearest interpolation function in accordance with the present invention.

FIG. 16A illustrates a nearest interpolation function in accordance with the present invention, and FIG. 16B illustrates Fourier conversion of the nearest interpolation function in accordance with the present invention.

As depicted in FIGS. 16A and 16B, the nearest interpolation is a method for using a functional value of an adjacent data as it is, it has the smallest complexity. The nearest interpolation technique can be described as following Equation 12.

$$f(x) = f(x_k) \quad \frac{x_{k-1} + x_k}{2} \le x \le \frac{x_k + x_{k+1}}{2} \quad [\text{Equation 12}]$$

-continued $$h(x) = 1 \quad \text{if} \quad 0 \le \text{abs}(x) \le 0.5$$
$$h(x) = 0 \quad \text{if} \quad 0.5 \le \text{abs}(x)$$

Herein, abs(x) is an absolute value of x, hereinafter, abs of all Equations includes an absolute value.

In the nearest interpolation function, side robe has comparatively high importance in the Fourier function. Accordingly, response characteristics of two frequencies are not good and a surrounding pixel value is used as it is, blocky apprarance may occur. However, in comparison with other interpolations, the nearest interpolation function is very simple and has less complexity, recently usage thereof is increased.

Figure 17:
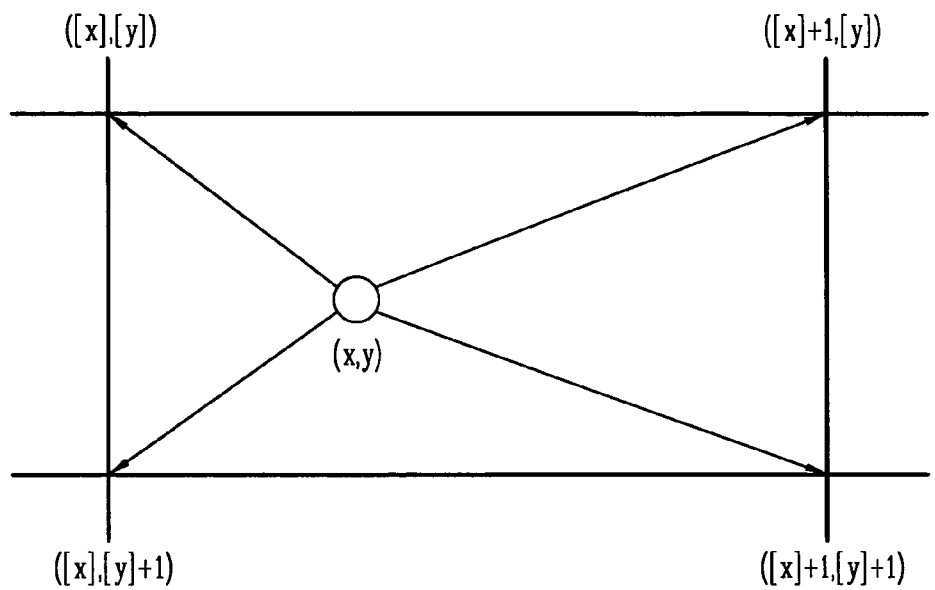
FIG. 17 is for describing a concept of a two-dimensional nearest interpolation in accordance with the present invention.

FIG. 17 is for describing a concept of a two-dimensional nearest interpolation in accordance with the present invention.

As depicted in FIG. 17, alike a first-dimension, in the two-dimensional nearest interpolation used for an actual image, interpolation is performed by using only a pixel value on the nearest coordinate.

Figure 18:
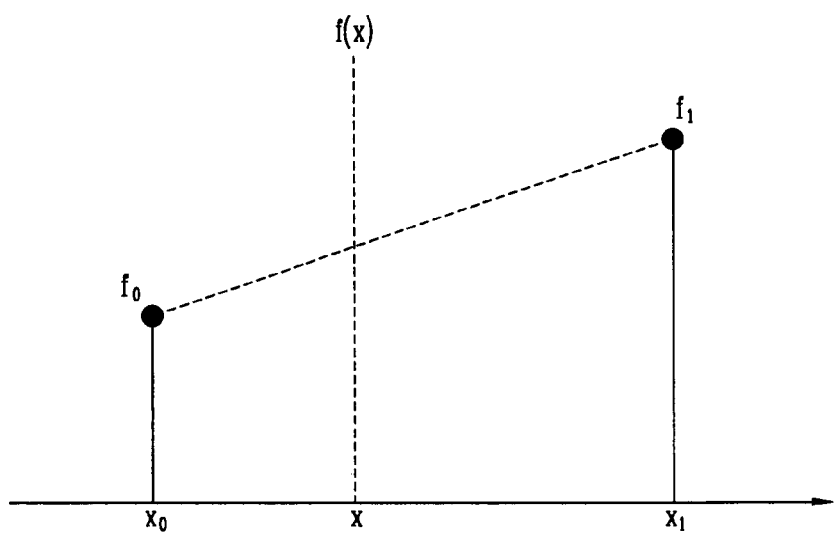
FIG. 18 is for describing a concept of linear interpolation in accordance with the present invention.

FIG. 18 is for describing a concept of linear interpolation in accordance with the present invention.

As depicted in FIG. 18, in the linear interpolation, interpolation is performed by using a first-dimensional interpolation function with two input signals.

The linear interpolation can be described as following Equation 13, and the linear interpolation function can be described as following Equation 14.

$$f(x) = f_0 + \left[\frac{x - x_0}{x_1 - x_0}\right](f_1 - f_0) \quad [\text{Equation 13}]$$

[Equation 14]

$h(x)=1-abs(x)$ if $0 \le abs(x) \le 1$ $h(x)=0$ if $1 \le abs(x)$

In comparison with the nearest interpolation, the linear interpolation has frequency response characteristics almost same with those of a low pass filter, it has better function and comparatively simple operational process.

Figure 19A:
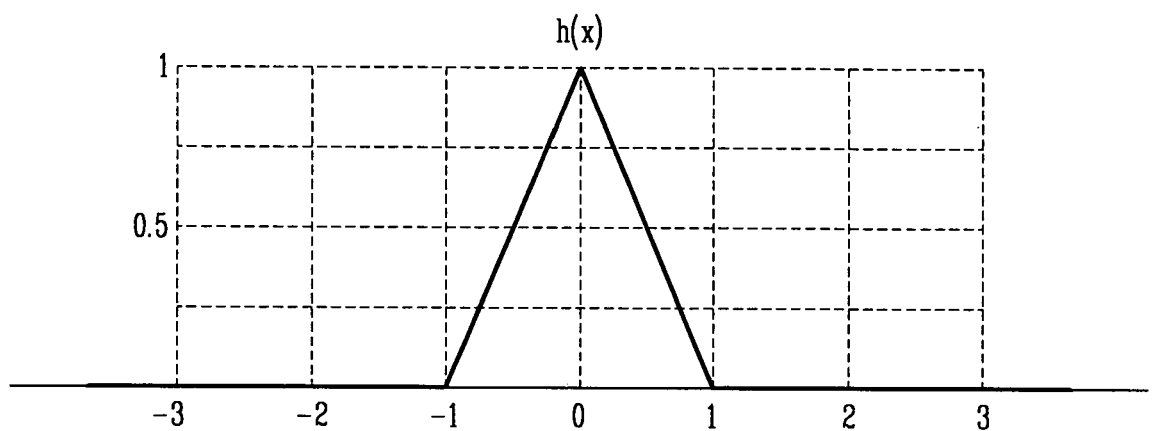
FIG. 19A illustrates a linear interpolation function in accordance with the present invention.
Figure 19B:
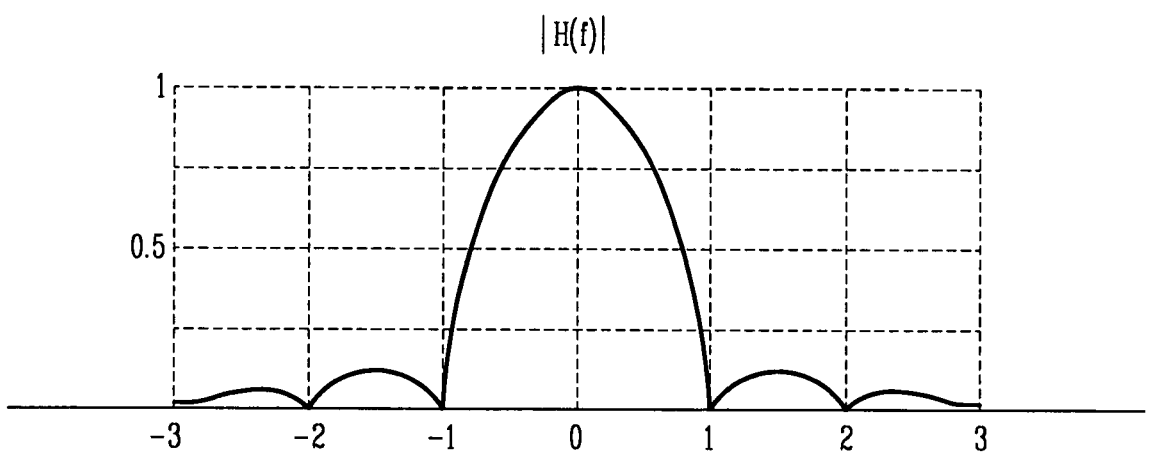
FIG. 19B illustrates Fourier conversion of the nearest interpolation function in accordance with the present invention.

FIG. 19A illustrates a linear interpolation function in accordance with the present invention, and FIG. 19B illustrates Fourier conversion of the nearest interpolation function in accordance with the present invention.

As depicted in FIG. 19, unlike the nearest interpolation, in the two-dimensional linear interpolation, different significance is given according to a distance by using all four pixel values. In addition, in comparison with the nearest interpolation, it has greater complexity, however, it is comparatively simple and less operational quantity than the rest interpolations except the nearest interpolation.

Figure 20:
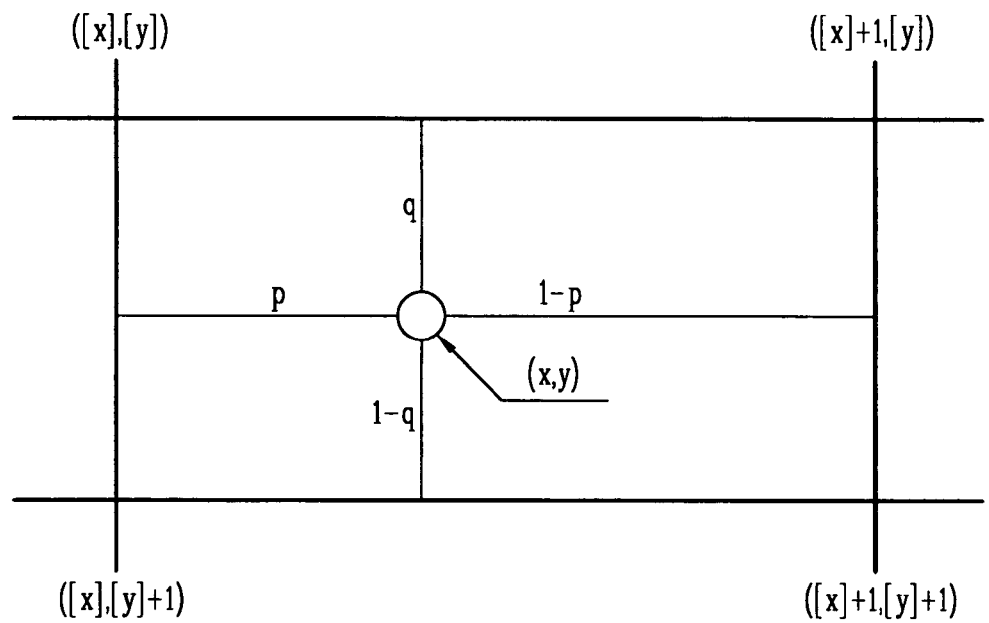
FIG. 20 is for describing a concept of linear interpolation in accordance with the present invention.

FIG. 20 is for describing a concept of linear interpolation in accordance with the present invention.

As depicted in FIG. 20, when f(x,y) is Δx=x−[x], Δy=y−[y], it can be described as following Equation 15.

$$f(x, y) = (1 - \Delta x)(1 - \Delta y) \cdot f([x], [y]) + \quad \text{[Equation 15]}$$
$$\Delta x \cdot (1 - \Delta y) \cdot f([x]+1, [y]) +$$
$$(1 - \Delta x) \cdot \Delta y \cdot f([x], [y]+1) +$$
$$\Delta x \cdot \Delta y \cdot f([x]+1, [y]+1)$$

The nearest interpolation performs interpolation by using zero-dimensional interpolation function, the linear interpolation performs interpolation by using the one-dimensional interpolation function, and the three-dimensional interpolation performs interpolation by using a three-dimensional interpolation function.

[Equation 16]

$$h(x) = a_{30} abs(x)^2 + a_{20} abs(x)^2 + a_{10} abs(x) + a_{00}$$

if $$0 \leq abs(x) < 1$$

$$h(x) = a_{31} abs(x)^2 + a_{21} abs(x)^2 + a_{11} abs(x) + _{01}$$

if $$1 \leq abs(x) < 2$$

$$h(x) = 0$$

if otherwise

Herein, aij is a constant and has to be determined so as to satisfy following conditions. In more detail, when h(0)=1, abs(x)=1, 2, the h(x) has to be '0', when abs(x)=0, 1, 2, the h(x) has to be consecutive and a primary differentiation has to be consecutive.

In the above-described interpolation methods, by considering complexity, accuracy of a pixel value, intricacy and operational speed of hardware required for the operational process, an interpolation method appropriate to the silicon convergence device is selected.

A pixel required for the nearest interpolation is one, by using one frame memory, calculation can be performed with one access. Accordingly, because the number of SRAMs is small, it consumes less power in operating of a circuit board and has faster speed. In addition, a memory access frequency can be set as 27 MHz, a circuit can be operated stably. However, in case of an image having a character corresponded to a high frequency or a thin line, the nearest interpolation has a demerit as picture quality deterioration.

In addition, in the linear interpolation, the number of required pixels is four. Accordingly, in consideration of operational speed of hardware and trade-off of the hardware structure, it can be implemented by following three methods. First, the linear interpolation performs calculation with one access by using four frame memories. Herein, a memory access frequency is 27 MHz, and there is no need to use a data storing buffer. Second, the linear interpolation performs calculation with two accesses by using two frame memories. Herein, a memory access frequency is 54 MHz, and two data storing buffers are required. Third, the linear interpolation performs calculation with four accesses by using one frame memory. Herein, a memory access frequency is 108 MHz, and four data storing buffers are required. Herein, in the silicon convergence device, an excessively high frequency is not appropriate and increase of the number of frame memories causes a certain problems, it may inappropriate to use a higher-dimensional interpolation not less than the linear interpolation using the SRAM. However, when the silicon convergence device is implemented with the SRAM or an AXIS (application-specific integrated circuit), operational speed is increased greatly, it is possible to use a higher-dimensional interpolation such as the linear interpolation, etc. and picture quality deterioration (generation loss) can be prevented.

Figure 21:
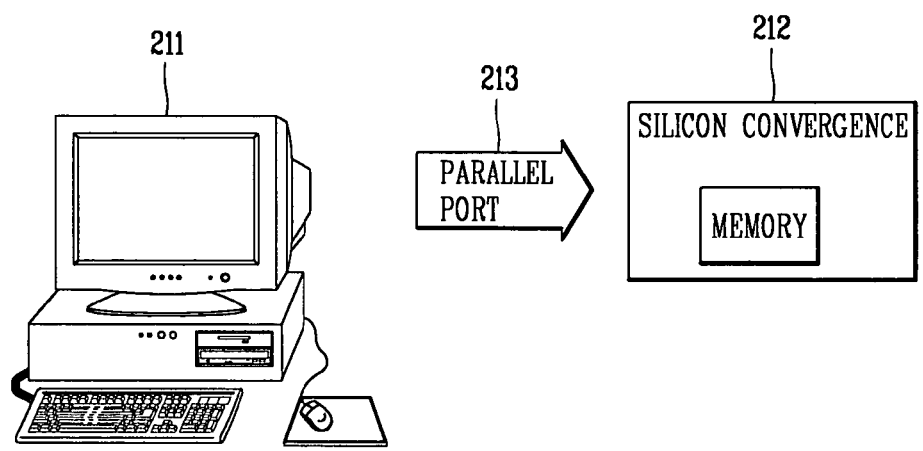
FIG. 21 illustrates interface between a PC and a silicon convergence device in accordance with the present invention.

FIG. 21 illustrates interface between a PC and a silicon convergence device in accordance with the present invention.

As depicted in FIG. 21, the virtual screen method can adjust detailed adjustment of a distorted image by dividing an image into several blocks according to a request, distortion correction information of a silicon convergence device 212 can be easily adjusted by using a PC or a notebook computer 211 through a parallel port 213. Herein, it is easy to implement a window program for detailed adjustment of an image, by using that, the silicon convergence device 212 can be easily suited for distortion phenomenon different according to each R, G, B image, and it is easy to perform distortion correction independently according to each R, G, B image.

Figure 22A:
FIG. 22A illustrates an example of a test image before performing conversion correction in accordance with the present invention.
Figure 22B:
FIG. 22B illustrates an example of a test image after performing distortion conversion.

FIG. 22A illustrates an example of a test image before performing conversion correction in accordance with the present invention, and FIG. 22B illustrates an example of a test image after performing distortion conversion.

As depicted in FIGS. 22A and 22B, image distortion interpolation based on the three-dimensional virtual screen method can be very efficiently operated.

As described-above, in the image distortion correcting apparatus in accordance with the present invention, by correcting image distortion by the digital image processing method, there is no need to use an additional convergence yoke, and accordingly a product can be light-weighted.

In the image distortion correcting apparatus in accordance with the present invention, by correcting image distortion by the digital image processing method, influence of an electromagnetic field due to a convergence yoke can be reduced, and accordingly life-span of a product can be increased.

In the image distortion correcting apparatus in accordance with the present invention, by correcting image distortion by the digital image processing method, adaptability according to a model change of a video display device, design change and environment change can be improved.

In addition, in the image distortion correcting apparatus in accordance with the present invention, by correcting image distortion by the digital image processing method, productivity in a product manufacturing step including an image distortion correcting process can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An image distortion correcting apparatus, comprising:
   a reference image generating means for generating a reference image and setting a coordinate of the reference image;

a displacement measuring means for displaying the reference image on a screen and measuring a coordinate of the displayed reference image;

a distortion information extracting means for extracting distortion information on the basis of a coordinate value of the reference image and a coordinate value of the measured displayed reference image and generating inverse-distortion information; and a distortion correcting means for generating an inverse-distorted image of the reference image on the basis of the generated inverse-distortion information.

2. The apparatus of claim 1, further comprising:

a memory means for updating the generated inverse-distortion information and storing the updated generated inverse-distortion information.

3. The apparatus of claim 2, wherein the memory means comprises a static random access memory SRAM so as to perform high speed storing and access of the inverse-distortion information.

4. The apparatus of claim 1, wherein the distortion information extracting means includes an image interpolating means to perform pixel unit interpolation of the displayed reference image.

5. The apparatus of claim 4, wherein the image interpolating means uses one of a one-dimensional interpolation, a two-dimensional interpolation, a linear interpolation, a nearest interpolation or a three-dimensional interpolation.

6. The apparatus of claim 1, wherein the distortion information extracting means extracts the distortion information on the basis of a three-dimensional virtual screen and generates the inverse-distortion information.

7. The apparatus of claim 6, wherein the three-dimensional virtual screen is a virtual three-dimensional plane including cross points between straight lines indicating a path of the reference image from a cathode ray tube (CRT) to the screen and virtual straight lines vertically formed on the screen from a point in which the reference image is displayed on the screen without distortion.

8. A projection image display device, comprising:

a digital video signal processing means for converting an input video signal into a digital video signal;

an inverse-distortion information generating means for extracting a distortion parameter on the basis of the digital video signal and generating inverse-distortion information on the basis of the extracted distortion parameter the inverse-distortion information generating means generating the inverse-distortion information based on a coordinate value of a reference image and a coordinate value of a displayed image;

a memory means for updating the extracted inverse-distortion information and storing the updated inverse-distortion information;

an inverse-distortion processing means for performing inverse-distortion processing of the digital video image on the basis of the stored inverse-distortion information; and an image projecting means for displaying the inverse distortion-processed image.

9. The device of claim 8, wherein the inverse-distortion information generating means includes:

a reference image generating means for generating a coordinate of the digital video signal;

a displacement measuring means for displaying the reference image on a screen and measuring a coordinate of the displayed reference image; and a distortion information extracting means for extracting distortion information on the basis of coordinate value of the reference image and the coordinate value of the measured displayed reference image and generating inverse-distortion information.

10. The device of claim 8, wherein the memory means includes a static random access memory (SRAM) so as to perform high speed storing and access of the inverse-distortion information.

11. The device of claim 8, wherein the inverse-distortion information generating means extracts the distortion information on the basis of a three-dimensional virtual screen and generates the inverse-distortion information.

12. The device of claim 11, wherein the three-dimensional virtual screen is a virtual three-dimensional plane including cross points between straight lines indicating a path of a digital video signal from a cathode ray tube (CRT) to the screen and virtual straight lines vertically formed on the screen from a point in which the digital video signal is displayed on the screen without distortion.

13. An image distortion correcting method, comprising:

measuring a keystone distortion-parameter by displaying an input image on a screen;

performing inverse keystone distortion-correction of the input image on the basis of the measured keystone distortion-parameter;

measuring a pincushion distortion-parameter by displaying the inverse keystone distortion-corrected image on the screen; and performing inverse pincushion distortion-correction of the image displayed on the screen repeatedly on the basis of the measured pincushion distortion-parameter.

14. The method of claim 13, wherein the keystone distortion-parameter and the pincushion distortion-parameter are measured by grasping displacement of certain points on the basis of the image displayed on the screen.

15. The method of claim 13, wherein the keystone distortion-parameter and the pincushion distortion-parameter are gradually updated by performing each image distortion correcting process repeatedly.

16. An image distortion correcting method using a three-dimensional virtual screen technique, comprising:

initializing a virtual screen showing keystone distortion and pincushion distortion;

generating an inverse-distorted image on the basis of the initialized virtual screen;

generating a distortion-corrected image on the basis of the generated inverse-distorted image and displaying the generated image on a screen;

comparing the distortion-corrected image with the image displayed on the screen;

updating the virtual screen when the image displayed on the screen does not coincide with the distortion-corrected image; and finishing the virtual screen updating when the image displayed on the screen coincides with the distortion-corrected image.

17. The method of claim 16, wherein the virtual screen is updated in the updating of virtual screen and the initializing the virtual screen, the generating the inverse-distorted image, the generating the distortion-corrected image and the comparing the distortion-corrected image are repeatedly performed starting from the initializing the virtual screen.

18. The method of claim 16, wherein the three-dimensional virtual screen is a virtual three-dimensional plane including cross points between straight lines indicating a path of an input video signal from a cathode ray tube (CRT) to the screen and virtual straight lines vertically formed on the screen from a point in which the input video signal is displayed on the screen without distortion.

19. The method of claim 16, wherein the three-dimensional virtual screen is formed by adding a virtual screen functional value of the keystone distortion and a virtual screen functional value of the keystone distortion linearly.

20. The method of claim 16, wherein an image is divided into several blocks, and distortion of each image block is corrected.

* * * * *